US007191690B2

(12) United States Patent
Pollock et al.

(10) Patent No.: US 7,191,690 B2
(45) Date of Patent: Mar. 20, 2007

(54) HELICAL MECHANISM CUTTING UNIT AND METHOD FOR OPERATING FOR THE SAME

(75) Inventors: David Clarke Pollock, Somersworth, NH (US); Charles Francis Svenson, Laconia, NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/758,299

(22) Filed: Jan. 10, 2001

(65) Prior Publication Data

US 2002/0088322 A1 Jul. 11, 2002

(51) Int. Cl.
*B23D 25/02* (2006.01)
*B26D 1/12* (2006.01)

(52) U.S. Cl. .............................. 83/37; 83/342; 83/672

(58) Field of Classification Search .................. 83/342, 83/672, 37, 338
See application file for complete search history.

(56) References Cited

U.S. PATENT DOCUMENTS 1,580,916 A * 4/1926 Putt ............................ 83/342
1,693,589 A * 12/1928 Bolton ........................ 83/342
2,020,996 A * 11/1935 Crafts ......................... 83/342
2,172,359 A * 9/1939 Campbell .................... 83/342
2,183,722 A * 12/1939 Newman ..................... 83/342
2,234,105 A * 3/1941 Ashton et al. ................ 83/342
2,249,664 A * 7/1941 Morton et al. ................ 83/342
2,829,695 A * 4/1958 Jarvis .......................... 83/342
2,927,616 A * 3/1960 Bruner ........................ 83/672
3,056,323 A * 10/1962 Kwitek ........................ 83/342
3,172,320 A * 3/1965 Talbot ......................... 83/342
3,552,251 A * 1/1971 Neff et al. .................... 83/299
3,566,734 A * 3/1971 Robinson ..................... 83/346
3,570,348 A * 3/1971 Hallden ....................... 83/305
3,630,126 A * 12/1971 Ronai .......................... 493/11
3,656,382 A * 4/1972 Cyphers ...................... 83/672
3,776,084 A * 12/1973 Slyvakov ..................... 83/342
3,859,879 A * 1/1975 Spengler ...................... 83/342
4,014,234 A * 3/1977 Spengler ...................... 83/342
4,053,004 A * 10/1977 Barwise et al. ............... 83/672
4,493,235 A * 1/1985 Martin ........................ 83/303
4,606,254 A * 8/1986 Schmalz ...................... 83/874
4,630,514 A * 12/1986 Ohmori et al. ............... 83/341
5,000,812 A * 3/1991 Murphy ....................... 83/342
5,001,952 A * 3/1991 Myogadani .................. 83/342
5,386,753 A * 2/1995 Baron et al. .................. 83/342
5,526,726 A * 6/1996 Shore et al. .................. 83/672
5,765,460 A * 6/1998 Wathieu ...................... 83/311
5,873,293 A * 2/1999 Yamazaki .................. 83/508.3
6,032,558 A * 3/2000 Michler ...................... 101/216
6,389,941 B1 * 5/2002 Michler ...................... 101/216
6,742,427 B2 * 6/2004 Buta ........................... 83/338

FOREIGN PATENT DOCUMENTS

FR 470543 * 9/1914 .................. 83/342

* cited by examiner

*Primary Examiner*—Jason Prone
(74) *Attorney, Agent, or Firm*—Laurence A Greenberg; Werner H. Stemer; Ralph E. Locher

(57) ABSTRACT

A cutting unit is described that contains a pair of cylinders disposed opposite one another with a gap formed therebetween for receiving a ribbon. The pair of cylinders include a first cutting cylinder having a periphery with a cutting knife disposed helically about the periphery and a second cylinder. A drive rotates the first cutting cylinder for cutting the ribbon such that a signature cut from the ribbon has a smooth, straight edge.

13 Claims, 3 Drawing Sheets

HELICAL MECHANISM CUTTING UNIT AND METHOD FOR OPERATING FOR THE SAME

BACKGROUND OF THE INVENTION

1. Field of the Invention

The invention relates, generally, to a cutting unit, and more specifically, to a printing system or folder incorporating the cutting unit.

2. Description of the Related Art

In the art of printing systems, folders are used to cut signatures having varying lengths. In order to decrease the length of the signature, it is necessary to increase the angular velocity ratio between the folder and the printing units. As a result, the velocity of the signature is increased after it is cut. The increased velocity of the signature is counterproductive to downstream transport and deceleration functions. Therefore, the signature must be engaged by a deceleration mechanism for decelerating the signature before the signature can be further processed. Unfortunately, there is the inherent risk of damaging the signatures (i.e. dog-earing) and/or jamming the folder whenever the custody of the signature must be transferred from one machine component to another, i.e. from a transport unit to a deceleration unit. Therefore, it is desirable to limit the number of signature transfers occurring throughout the printing process.

The prior art folders are also known to cut the signature with a raking action of a serrated knife. The serrated knife thereby producing a saw-tooth (ragged) cut. The ragged cut is not desirable in the final product and therefore a subsequent trimming process is usually required to put the product in final form with a smooth edge.

SUMMARY OF THE INVENTION

It is accordingly an object of the invention to provide a cutting unit incorporating a helical mechanism for varying a cutting length and a method for operating the cutting unit which overcome the herein-mentioned disadvantages of the heretofore-known devices and methods of this general type, in which a ribbon can be cut to different lengths without increasing the velocity of the cut signatures or changing hardware components.

With the foregoing and other objects in view there is provided, in accordance with the invention, a cutting unit containing a pair of cylinders disposed opposite one another with a gap formed there-between for receiving a ribbon. The pair of cylinders is formed of a first cutting cylinder having a periphery with a cutting knife disposed helically about the periphery and a second cylinder. A drive rotates the first cutting cylinder for cutting the ribbon such that a signature cut from the ribbon has a smooth, straight edge.

In accordance with an added feature of the invention, the drive is a first drive and there is provided a second drive rotating and mounting the second cylinder. The first drive and the second drive rotate the cylinders such that a component of travel of a point of contact between the cylinders in a direction of travel of the ribbon matches a speed of the ribbon for cutting the ribbon in a straight line. The drives can be motors, gears to be driven by motors, and other generic types of drives.

In accordance with an additional feature of the invention, a control unit is connected to and controls the first drive and the second drive for controlling a rotational speed of the first cutting cylinder and the second cylinder.

In accordance with another feature of the invention, the cutting unit has a subframe with a pivot point about which the subframe is pivotable. The first drive, the second drive, and the cylinders are supported by the subframe. A further drive is connected to the subframe for pivoting the subframe about its pivot point. A position of the subframe controls a position of the cylinders in regard to the ribbon and therefore controls a cutting length of the ribbon.

In accordance with a further feature of the invention, a sensor is connected to the control unit, the sensor provides control signals to the control unit for controlling the operation of the cylinders. The sensor is selected from the group consisting of cameras, optical scanners, speed sensors, and position sensors, and the control unit is a microprocessor based control unit.

With the foregoing and other objects in view there is also provided, in accordance with the invention, a folder formed of a frame, a subframe pivotally mounted in the frame about a pivot point, a drive housed in the subframe, and a pair of cylinders supported by the subframe and disposed opposite one another with a gap formed there-between for receiving a ribbon. The pair of cylinders includes a first cutting cylinder having a periphery with a cutting knife disposed helically about the periphery and a second cylinder. The first cutting cylinder is driven by the drive for cleanly cutting the ribbon such that a signature cut from the ribbon has a smooth, straight edge.

With the foregoing and other objects in view there is further provided, in accordance with the invention, a method for cutting ribbons. The method includes the step of transporting a ribbon between a pair of cylinders of a cutting unit disposed pivotally in a folder. The pair of cylinders includes a first cutting cylinder having a periphery with a cutting knife disposed helically about the periphery and a second cylinder. The cylinders are rotated such that a component of travel of a point of contact between the cylinders in a direction of travel of the ribbon matches a speed of the ribbon for cutting the ribbon such that a signature cut from the ribbon has a smooth, straight edge.

In accordance with a concomitant feature of the invention, there are the steps of increasing an angle between the cylinders and the ribbon for decreasing a cutting length of the signature, and adjusting a rotational speed of the cylinders for maintaining a straight cut of the signature; and decreasing the angle between the cylinders and the ribbon for increasing the cutting length of the signature, and adjusting the rotational speed of the cylinders for maintaining the straight cut of the signature.

Other characteristic features of the invention are set forth in the appended claims.

Although the invention is illustrated and described herein as embodied in a cutting unit incorporating a helical mechanism for varying a cutting length and a method for operating the cutting unit, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE PREFERRED EMBODIMENTS

Figure 1:
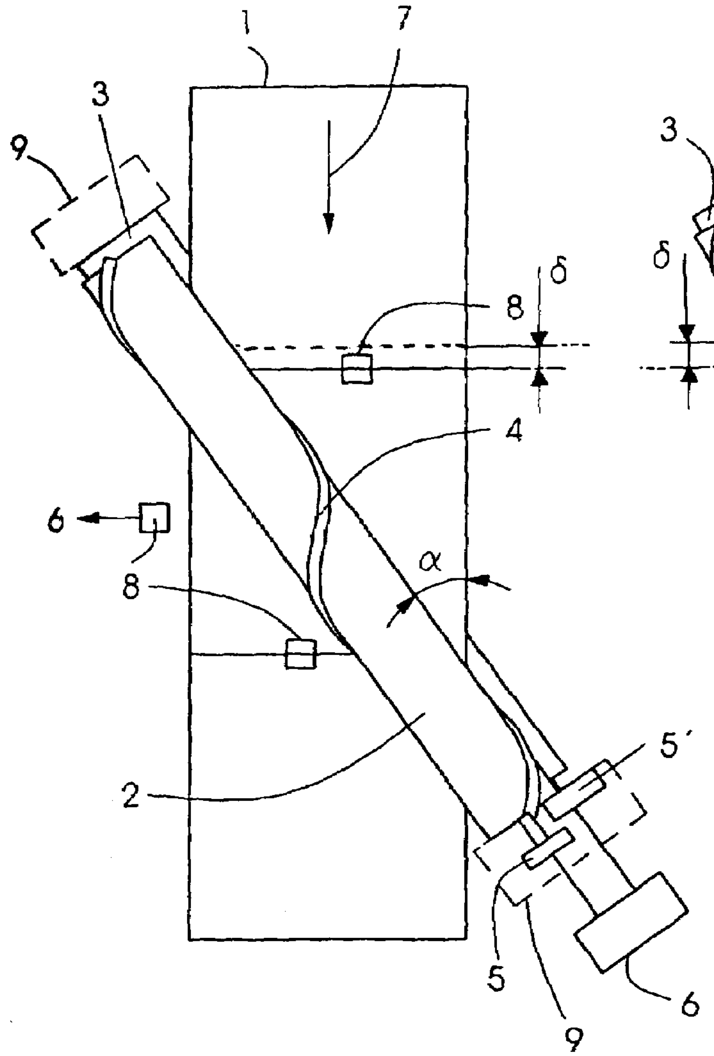
FIG. 1 is a diagrammatic, plan view of a cutting unit according to the invention.

In all the figures of the drawing, sub-features and integral parts that correspond to one another bear the same reference symbol in each case. Referring now to the figures of the drawings in detail and first, particularly, to FIG. 1 thereof, there is shown a cutting unit for cutting a ribbon 1 such as a ribbon of paper. The cutting unit includes a pair of cylinders including a first cutting cylinder 2 disposed above the ribbon 1 and a second cylinder 3 disposed below the ribbon 1. The first cutting cylinder 2 has on its periphery a helically configured cutting knife 4. The second cylinder 3 may be a blank cylinder, have a mating anvil or be formed of "cutting rubber". A gap is formed between the cylinders 2, 3 which gap receives the ribbon 1.

Figure 4:
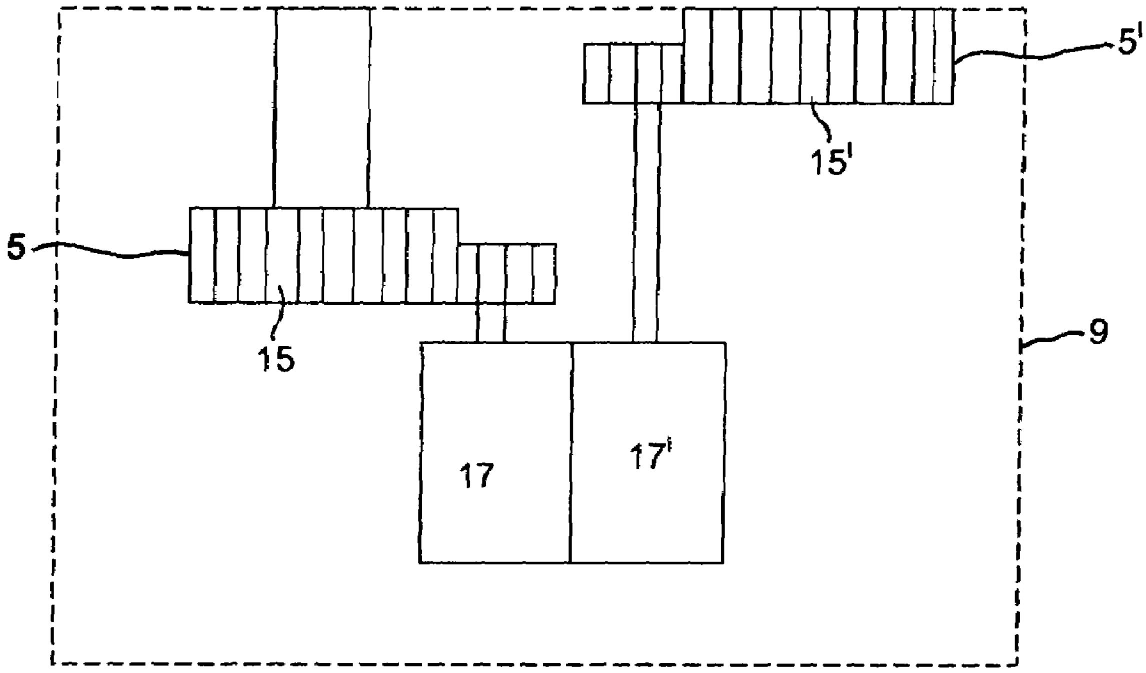
FIG. 4 is a side-elevational view of one particular embodiment of the drive mechanism shown in FIG. 1.

The cylinders 2, 3 are oriented at an angle α to the ribbon 1, and the cylinders 2, 3 are driven or rotated by drives 5, 5' at a speed proportional to a speed of the ribbon 1. As the cylinders rotate 2, 3, a point of contact (i.e. a point of cutting) between the cylinders 2, 3 travels across a width of the ribbon 1 and also in a direction of travel 7 of the ribbon 1 due to helical configuration of the cutting knife 4. In order to cut the ribbon 1 in a straight line that is substantially perpendicular to the traveling direction of the ribbon 1, the proportionality constant of rotation of the cylinders 2, 3 is chosen such the component of travel of the point of contact in the direction of travel 7 of the ribbon 1 exactly matches the speed of the ribbon 1. The drives 5, 5' are in turn controlled by a control unit 6 that may be part of the cutting unit, a folder that incorporates the cutting unit or the printing system that incorporates the cutting unit. The drives 5, 5' may be motors, gears (15, 15' of FIG. 4) driven by a motor (17, 17' of FIG. 4), a belt and pulley system, etc. The control unit 6 is a microprocessor based control system.

When a different cut-to-cut length of the ribbon 1 is required by the printing system, the angular orientation α of the cylinders 2, 3 relative to the ribbon 1 is changed. In addition, the proportionality constant of rotation of the cylinders 2, 3 is adjusted so that the component of travel of the point of contact in the direction of travel 7 of the ribbon 1 still matches the speed of the ribbon 1.

If the angle α of the cylinders 2, 3 in relationship to the ribbon 1 is decreased (the cylinders 2, 3 are oriented more parallel to the ribbon 1), the cylinders 2, 3 are rotated faster for a given press speed to maintain a straight cut. Reorienting the cylinders 2, 3 in this direction results in a longer cut-to-cut length of the ribbon 1. On the other hand, if the angle α of the cylinders 2, 3 in relationship to the ribbon 1 is increased (the cylinders 2, 3 are oriented less parallel to the ribbon 1), the cylinders 2, 3 are rotated slower for a given press speed to maintain a straight cut. Reorienting the cylinders 2, 3 in this direction results in a shorter cut-to-cut length of the ribbon 1.

Figure 2:
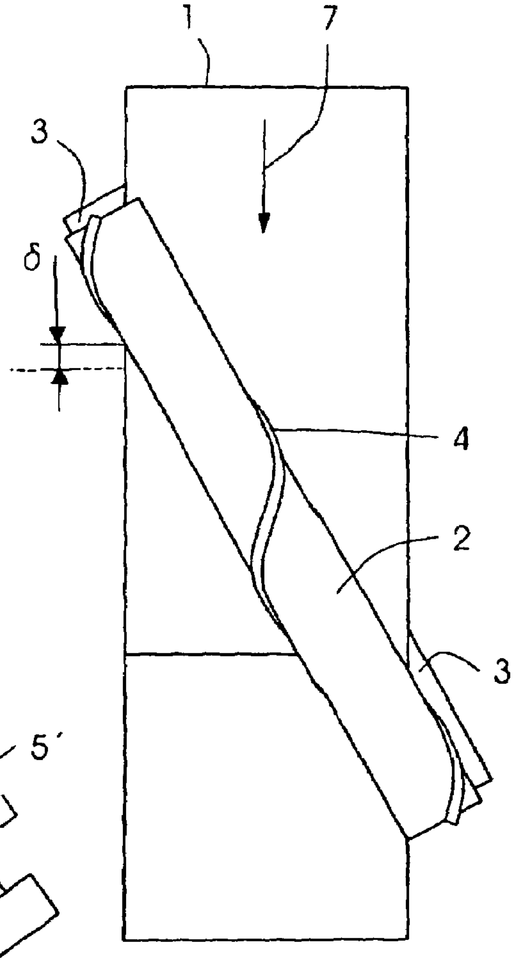
FIG. 2 is a plan view of the cutting unit.

In FIG. 2, the cylinders 2, 3 are oriented more parallel to the ribbon 1. Therefore the cut-to-cut length of the ribbon 1 is changed by an amount δ from that of FIG. 1, as shown in FIGS. 1 and 2.

Figure 3:
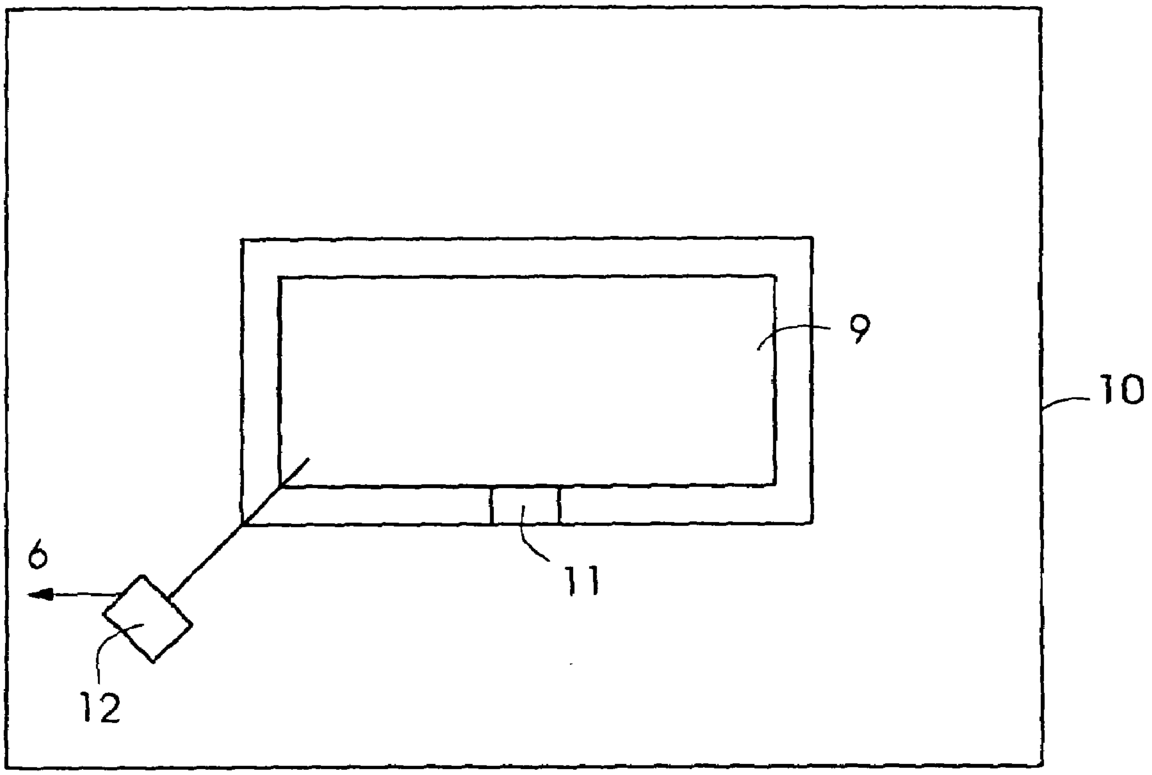
FIG. 3 is a side-elevational view of a subframe pivotably mounted in a frame of a folder.

FIG. 3 shows a side view of a subframe 9 of the cutting unit that is in turn housed in a frame 10 of a folder. The subframe 9 and the frame 10 are only diagrammatically shown in the drawing. The subframe 9 houses the drives 5, 5' which in turn mount and rotate the cylinders 2, 3. In FIG. 3 the drives 5, 5' and the cylinders 2, 3 are not visible as they reside on the other side of the subframe 9. The subframe 9 is pivotable with regards to the frame 10 and therefore, the cylinders 2, 3 can be pivoted in regards to the ribbon 1 and the angle α can be controlled by the location of the subframe 9 to the frame 10. The subframe 9 has a pivot point 11 about which it can be driven by a drive or cylinder 12 such as an air cylinder or a hydraulic cylinder. In addition, the subframe 9 can be pivotably mounted with the frame 10 in a ball and screw fashion. It is noted that many manners of mounting the subframe 9 to frame 10 are known and any pivotable manner is acceptable and the two forms discussed are only examples of many possibilities.

Sensors 8 are disposed in the travel path of the ribbon 1 and are connected to the control unit 6 for monitoring the cutting operation of the ribbon 1 (only one of the sensors is shown to be connected to the control unit for clarity reasons). The sensors 8 provide data to the control unit 6 for adjusting the cutting operation of the ribbon 1. Should the sensors 8 detect an unacceptable cut, the control unit 6 can adjust the rotational speed of the cylinders 2, 3 via the drives 5, 5' or adjust the angle α. In addition, the sensors 8 can detect a faulty operation of the cutting unit and instruct the shutdown of the cutting unit. The sensors 8 can be cameras, scanners, speed sensors, optical scanners, etc.

The nature of the cutting process represents two of the virtues of the invention. First, and unlike most folders that cut all at once between the rotating cylinders, the cutting process can be spread over as much time as desired. This greatly reduces the impulse forces that are created and transmitted back through the cutting unit and the printing system. The impulse forces having a disruptive effect on other printing processes including the registration of the cut to the print on the ribbon 1. Second, the protracted cutting can be done using blades that produce a clean, unserrated cut. Therefore, no further additional finishing steps are necessary (i.e. cutting away the serrated cut in the prior art). This results in savings in that no additional cutting equipment is necessary, paper waste is reduced, and the printing process is quicker.

We claim:

1. A method for cutting a ribbon, comprising:

providing a cutting unit including, a pair of cylinders disposed opposite one another with a gap formed there-between for receiving a ribbon on a travel path, the pair of cylinders including a first cutting cylinder having a periphery with a cutting knife disposed helically about the periphery and a second cylinder, one drive rotating the first cutting cylinder at a speed proportional to the speed of the ribbon for cutting the ribbon and providing a signature cut from the ribbon with a smooth, straight edge, a subframe having a pivot point, the subframe being pivotable about the pivot point, the subframe supporting the cylinders, and the subframe controlling a position of the cylinders in regard to the ribbon and therefore controlling a cutting length of the ribbon, and a further drive connected to the subframe for pivoting the subframe about the pivot point;

changing the length of the ribbon by controlling the further drive to change the angular orientation of the pair of cylinders relative to the ribbon; and contemporaneously with the step of controlling the further drive, controlling the one drive to change a rotational speed of the pair of cylinders such that a component of travel of a point of contact between the pair of cylinders in a direction of travel of the ribbon matches a speed of the ribbon for cutting the ribbon such that a signature cut from the ribbon has a smooth, straight edge extending substantially perpendicular to the traveling direction of the ribbon on said travel path.

2. The method of claim 1, wherein, in order to increase the cutting lengths of the ribbon, the pair of cylinders are rotated faster when an angle of the cylinders relative to the ribbon is decreased.

3. A folder, comprising:

a frame;

a subframe pivotably mounted in said frame about a pivot point;

one drive housed in said subframe;

a pair of cylinders supported by said subframe and disposed opposite one another with a gap formed there-between for receiving a ribbon on a travel path, said pair of cylinders including a first cutting cylinder having a periphery with a cutting knife disposed helically about said periphery and a second cylinder, said first cutting cylinder driven by said one drive at a speed proportional to the speed of the ribbon for cleanly cutting the ribbon and providing a signature cut from the ribbon with a smooth, straight edge;

said subframe controlling a position of said cylinders in regard to the ribbon arid therefore controlling a cutting length of the ribbon;

a further drive connected to said subframe for pivoting said subframe about said pivot point;

a control unit connected to and controlling said further drive to change the angular orientation of said pair of cylinders relative to the ribbon;

said control unit additionally connected to and controlling said one drive for controlling a rotational speed of said pair of cylinders such that, a component of travel of a point of contact between said pair of cylinders in a direction of travel of the ribbon matches a speed of the ribbon for cutting the ribbon to produce a signature cut from the ribbon, said signature cut having a smooth, straight edge extending substantially perpendicular to the traveling direction of the ribbon on said travel path; and said control unit changing the rotational speed of said pair of cylinders contemporaneously with changing the angular orientation of said pair of cylinders relative to the ribbon to adjust the cutting lengths of the ribbons to produce said substantially perpendicular signature cut.

4. The folder according to claim 3, wherein said one drive is a first drive and including a second drive rotating and mounting said second cylinder.

5. The folder of claim 3, wherein, in order to increase the cutting lengths of the ribbon, said control unit causes said cylinders to be rotated faster when an angle of said cylinders relative to the ribbon is decreased.

6. A cutting unit, comprising:

a pair of cylinders disposed opposite one another with a gap formed there-between for receiving a ribbon on a travel path, said pair of cylinders including a first cutting cylinder having a periphery with a cutting knife disposed helically about said periphery and a second cylinder;

one drive rotating said first cutting cylinder at a speed proportional to the speed of the ribbon for cutting the ribbon and providing a signature cut from the ribbon with a smooth, straight edge;

a subframe having a pivot point, said subframe being pivotable about said pivot point, said subframe supporting said cylinders, and said subframe controlling a position of said cylinders in regard to the ribbon and therefore controlling a cutting length of the ribbon;

a further drive connected to said subframe for pivoting said subframe about said pivot point;

a control unit connected to and controlling said further drive to change the angular orientation of said pair of cylinders relative to the ribbon;

said control unit additionally connected to and controlling said one drive for controlling a rotational speed of said pair of cylinders such that a component of travel of a point of contact between said pair of cylinders in a direction of travel of the ribbon matches a speed of the ribbon for cutting the ribbon to produce a signature cut from the ribbon, said signature cut having a smooth, straight edge extending substantially perpendicular to the traveling direction of the ribbon on said travel path; and said control unit changing the rotational speed of said pair of cylinders contemporaneously with changing the angular orientation of said pair of cylinders relative to the ribbon to adjust the cutting lengths of the ribbons to produce said substantially perpendicular signature cut.

7. The cutting unit according to claim 6, wherein said one drive is a first drive, and including a second drive rotating and mounting said second cylinder, said first drive and said second drive are supported by said subframe.

8. The cutting unit according to claim 6, wherein said one drive is a first drive, a second drive rotates and mounts said second cylinder, and said first drive and said second drive are motors.

9. The cutting unit according to claim 6, wherein said one drive as a first drive, a second drive rotates and mounts said second cylinder, and said first drive and said second drive are gears to be driven by motors.

10. The cutting unit according to claim 6, wherein said cutting unit further includes a sensor selected from the group consisting of cameras, optical scanners, speed sensors, and position sensors, and said control unit is a microprocessor based control unit.

11. The cutting unit according claim 6, wherein at least one sensor provides control signals to said control unit to maintain an acceptable cut of the ribbon by adjustment of the rotational speed of said cylinder drives, or by adjustment of said further drive pivoting said subframe.

12. The cutting unit according claim 6, wherein at least one sensor detects an unacceptable cut of the ribbon, arid said control unit adjusts the rotational speed of the cylinders by adjusting the drives.

13. The cutting unit according to claim 6, wherein at least one sensor detects an unacceptable cut of the ribbon, and said control unit adjusts the rotational speed of the cylinders by controlling the position of said cutting cylinders.

* * * * *

UNITED STATES PATENT AND TRADEMARK OFFICE

CERTIFICATE OF CORRECTION

PATENT NO. : 7,191,690 B2
APPLICATION NO. : 09/758299
DATED : March 20, 2007
INVENTOR(S) : David Clarke Pollock et al.

It is certified that error appears in the above-identified patent and that said Letters Patent is hereby corrected as shown below:

Title Page

Item (73) should read as follows:

Goss International Americas, Inc.

Dover, New Hampshire (US)

Signed and Sealed this
Twenty-ninth Day of March, 2011

David J. Kappos
*Director of the United States Patent and Trademark Office*